United States Patent
Nakamoto

(10) Patent No.: US 11,563,928 B2
(45) Date of Patent: Jan. 24, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hisashi Nakamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/081,024

(22) Filed: Oct. 27, 2020

(65) Prior Publication Data
US 2021/0136344 A1 May 6, 2021

(30) Foreign Application Priority Data
Nov. 5, 2019 (JP) .............................. JP2019-200857

(51) Int. Cl.
*H04N 13/167* (2018.01)
*H04N 13/178* (2018.01)
*H04N 13/183* (2018.01)
*H04N 13/00* (2018.01)

(52) U.S. Cl.
CPC ......... *H04N 13/167* (2018.05); *H04N 13/178* (2018.05); *H04N 13/183* (2018.05); *H04N 2013/0096* (2013.01)

(58) Field of Classification Search
CPC . G06T 15/20; G06T 19/20; G06T 2219/2024;
H04N 13/117; H04N 13/167; H04N 13/178; H04N 13/183; H04N 13/243; H04N 13/398; H04N 2013/0096
See application file for complete search history.

(56) References Cited

U.S. PATENT DOCUMENTS

| | | | |
|---|---|---|---|
| 9,560,319 B1 * | 1/2017 | Pan | H04N 21/233 |
| 9,769,544 B1 * | 9/2017 | Pau | H04N 21/45 |
| 10,096,169 B1 * | 10/2018 | Chenillo | H04L 65/602 |
| 10,699,488 B1 * | 6/2020 | Terrano | G06N 20/00 |
| 11,082,662 B2 * | 8/2021 | Prins | H04N 7/157 |
| 2001/0017671 A1 * | 8/2001 | Pleven | H04N 5/2723 348/722 |

(Continued)

FOREIGN PATENT DOCUMENTS

WO 2016/194441 A1 12/2016

*Primary Examiner* — Peter D Le
(74) *Attorney, Agent, or Firm* — Carter, DeLuca & Farrell LLP

(57) ABSTRACT

Provided is an image processing apparatus including: a virtual viewpoint image generating unit that generates a virtual viewpoint image which is a video, based on captured images captured by image capturing apparatuses from different directions; an electronic sign information obtaining unit that obtains information indicating a timing at which a content displayed on an electronic sign changes, the electronic sign being contained in the virtual viewpoint image and configured to change the content to be displayed on a time basis; and a control unit that performs control to cause a display unit to display the virtual viewpoint image having a virtual content inserted, the virtual content being a content that is virtual and not contained in the captured images. Based on the information, the control unit controls how the virtual content is displayed on the virtual viewpoint image.

17 Claims, 14 Drawing Sheets

(56) References Cited

U.S. PATENT DOCUMENTS

| | | | | |
|---|---|---|---|---|
| 2002/0032053 A1* | 3/2002 | Shoji | ............... | A63F 13/57 463/30 |
| 2002/0056120 A1* | 5/2002 | McTernan | ............... | H04L 65/4092 725/87 |
| 2002/0057280 A1* | 5/2002 | Anabuki | ............... | G02B 27/017 345/633 |
| 2003/0095119 A1* | 5/2003 | Jeong | ............... | H04N 13/117 345/419 |
| 2004/0090391 A1* | 5/2004 | Kondo | ............... | H04N 9/12 345/1.1 |
| 2004/0105579 A1* | 6/2004 | Ishii | ............... | B60R 1/00 382/154 |
| 2005/0101365 A1* | 5/2005 | Ogita | ............... | A63F 13/10 463/7 |
| 2005/0129325 A1* | 6/2005 | Wu | ............... | H04N 7/144 382/254 |
| 2005/0156816 A1* | 7/2005 | Repetto | ............... | G02B 27/017 345/7 |
| 2008/0085767 A1* | 4/2008 | Takatsuka | ............... | A63F 13/812 463/32 |
| 2008/0192116 A1* | 8/2008 | Tamir | ............... | G06T 7/292 348/157 |
| 2008/0228422 A1* | 9/2008 | Satoh | ............... | G06F 3/011 702/92 |
| 2009/0144785 A1* | 6/2009 | Walker | ............... | H04N 5/262 725/105 |
| 2011/0181617 A1* | 7/2011 | Tsuda | ............... | G06F 3/0481 345/619 |
| 2013/0111459 A1 | 5/2013 | Nakamoto | | |
| 2014/0285518 A1* | 9/2014 | Tanaka | ............... | G02B 27/017 345/632 |
| 2015/0058401 A1 | 2/2015 | Nakamoto | | |
| 2016/0098860 A1* | 4/2016 | Basra | ............... | G06F 3/011 345/633 |
| 2017/0249019 A1* | 8/2017 | Sawyer | ............... | G02B 27/017 |
| 2018/0169524 A1* | 6/2018 | Kurita | ............... | A63F 13/31 |
| 2018/0232943 A1* | 8/2018 | Shikata | ............... | H04N 21/23412 |
| 2018/0288394 A1* | 10/2018 | Aizawa | ............... | H04N 13/117 |
| 2018/0318709 A1* | 11/2018 | Metelko | ............... | A63F 13/655 |
| 2018/0376122 A1* | 12/2018 | Park | ............... | H04N 13/239 |
| 2019/0385332 A1* | 12/2019 | Yajima | ............... | G02B 27/017 |
| 2020/0128292 A1* | 4/2020 | Bumgarner | ............... | H04N 21/44016 |
| 2020/0168119 A1* | 5/2020 | Ramani | ............... | G06Q 10/20 |
| 2020/0202419 A1* | 6/2020 | Beauchamp | ............... | G06T 19/006 |
| 2020/0250885 A1* | 8/2020 | Bian | ............... | G06T 7/55 |
| 2020/0322688 A1* | 10/2020 | Lehtiniemi | ............... | G06Q 10/10 |

\* cited by examiner

| | | 501 | 502 | 503 | 504 |
|---|---|---|---|---|---|
| | | ELECTRONIC SIGN 311 | ELECTRONIC SIGN 312 | ELECTRONIC SIGN 313 | ELECTRONIC SIGN 314 |
| 505 | DISPLAY CONTENTS | COMPANY A.mp4<br>COMPANY B.mp4<br>COMPANY C.mp4<br>COMPANY D.mp4 | COMPANY A.mp4<br>COMPANY B.mp4<br>COMPANY C.mp4<br>COMPANY D.mp4 | COMPANY A.mp4<br>COMPANY B.mp4<br>COMPANY C.mp4<br>COMPANY D.mp4 | COMPANY A.mp4<br>COMPANY B.mp4<br>COMPANY C.mp4<br>COMPANY D.mp4 |
| 506 | DISPLAY ORDER | COMPANY A<br>→ COMPANY B<br>→ COMPANY C<br>→ COMPANY D<br>(LOOP) | COMPANY B<br>→ COMPANY C<br>→ COMPANY D<br>→ COMPANY A<br>(LOOP) | COMPANY C<br>→ COMPANY D<br>→ COMPANY A<br>→ COMPANY B<br>(LOOP) | COMPANY D<br>→ COMPANY A<br>→ COMPANY B<br>→ COMPANY C<br>(LOOP) |
| 507 | INTERVALS | 60 SECONDS | 60 SECONDS | 60 SECONDS | 60 SECONDS |
| 508 | DATE OF EXECUTION | 6/28/2019 | 6/28/2019 | 6/28/2019 | 6/28/2019 |
| 509 | START TIME | 18:30 | 18:30 | 18:30 | 18:30 |
| 510 | END TIME | 21:30 | 21:30 | 21:30 | 21:30 |
| 511 | SPONSOR INFORMATION | COMPANIES A, B, C, D | COMPANIES A, B, C, D | COMPANIES A, B, C, D | COMPANIES A, B, C, D |

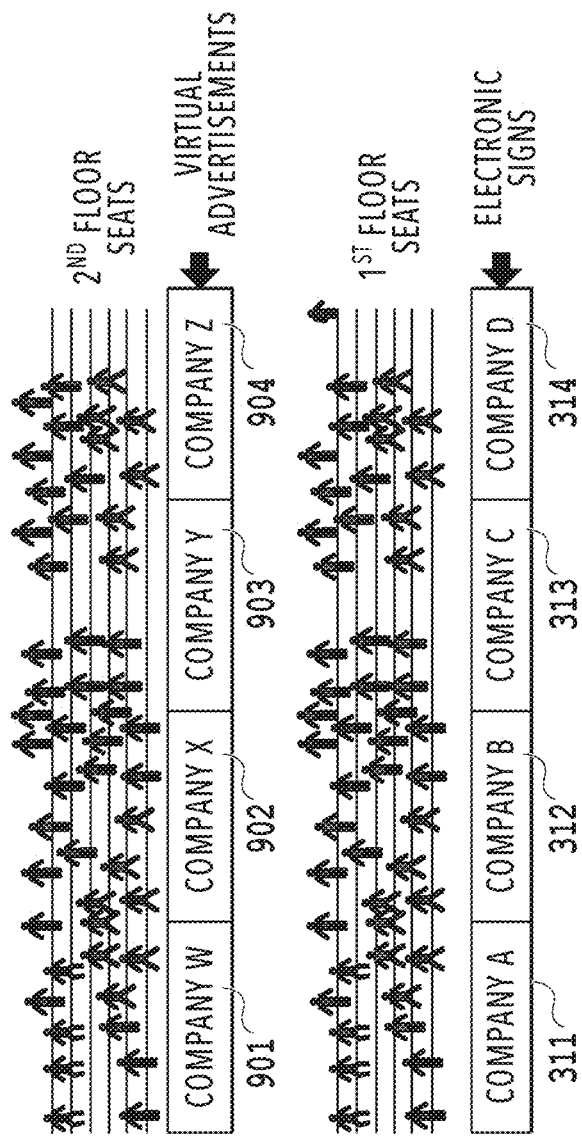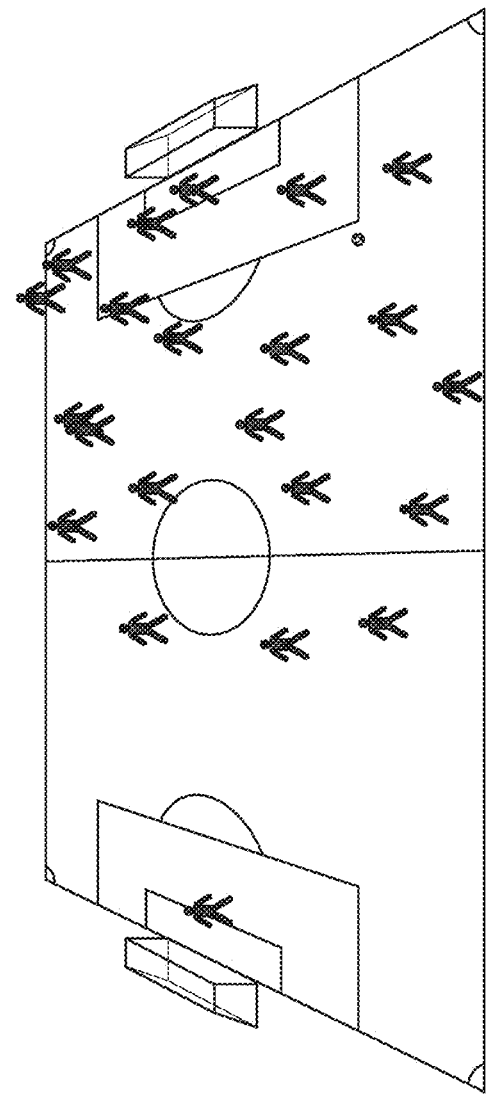
FIG. 9

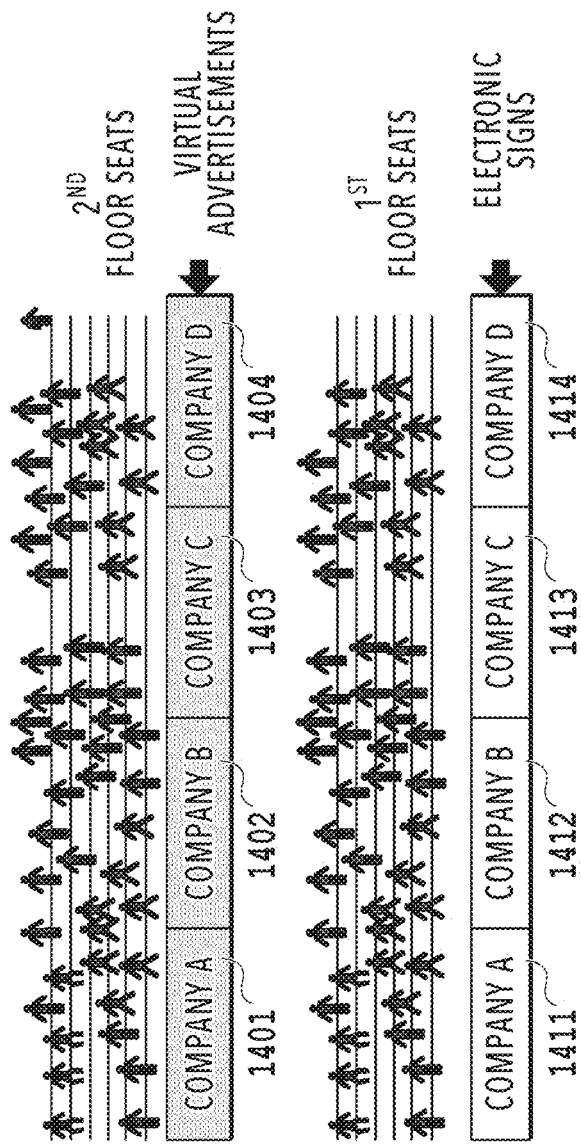
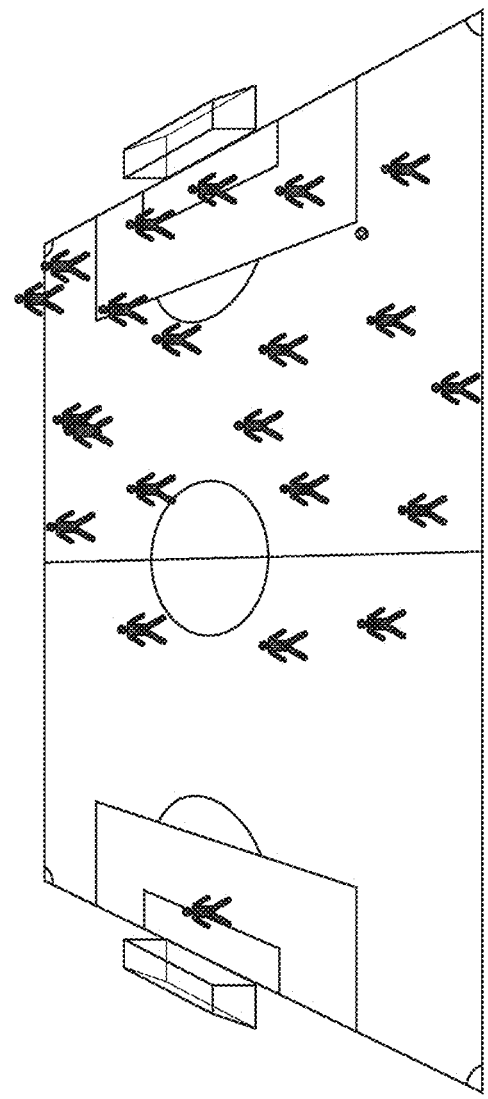
FIG.14

IMAGE PROCESSING APPARATUS, IMAGE PROCESSING METHOD, AND STORAGE MEDIUM

BACKGROUND OF THE INVENTION

Field of the Invention

The present disclosure relates to a virtual viewpoint image generated based on a plurality of captured images.

Description of the Related Art

There is a technique for generating a virtual viewpoint image based on images captured from a plurality of viewpoints. A virtual viewpoint image is generated as follows: images are captured by a plurality of image capturing apparatuses and are collected in an image processor such as a server, which then performs processing such as generation of three-dimensional shape data and rendering. Further, the virtual viewpoint image thus generated may be displayed with a virtual content superimposed thereon. A virtual content is created by computer graphics or the like and is, for example, an advertisement.

International Publication No. WO2016/194441 discloses a method for determining the position of an advertising space for displaying an advertisement which is a virtual content within a free viewpoint image using viewpoint information, so that a viewer can easily see the advertisement.

A virtual viewpoint image may be generated based on images capturing an image-capturing region containing a display device which temporarily changes a content to be displayed thereon. For example, in a case of generating a virtual viewpoint image of a soccer or rugby field as an image capturing target, the virtual viewpoint image may contain electronic signs installed around the field. In some cases, a virtual content which changes with time may be inserted and displayed on the virtual viewpoint image, if what is displayed on the display device and the virtual content change independently of each other in such a virtual viewpoint image containing both the display device and the virtual content, there is a concern that it is hard for the viewer to see the virtual viewpoint image. For example, if a virtual content and a content on a display device change at different tunings, those changes may draw the attention of the viewer, hindering the viewer from focusing on the sporting competition which is the shooting target.

SUMMARY OF THE INVENTION

An image processing apparatus of the present disclosure includes: a first obtaining unit configured to obtain data on a virtual viewpoint image which is a video, the virtual viewpoint image being generated based on image data on captured images captured by a plurality of image capturing apparatuses from different directions; a second obtaining unit configured to obtain information indicating a timing at which a content displayed on a display device changes, the display device being contained in the virtual viewpoint image and configured to change the content on a time basis; and a control unit configured to perform control to cause a display unit to display the virtual viewpoint image having a virtual content inserted, the virtual content being a content that is virtual and not contained in the captured images. Based on the information, the control unit controls how the virtual content is displayed in the virtual viewpoint image.

Further features of the present invention will become apparent from the following description of exemplary embodiments with reference to the attached drawings.

BRIEF DESCRIPTION OF THE DRAWINGS

FIG. 5 is a diagram illustrating electronic sign information;

FIG. 9 is a diagram illustrating electronic signs and virtual advertisements;

FIG. 14 is a diagram illustrating electronic signs and virtual advertisements.

DESCRIPTION OF THE EMBODIMENTS

Modes for carrying out the present embodiments are described below with reference to the drawings and the like. Note that the following embodiments are not intended to limit the technique of the present disclosure, and not all the configurations described in the following embodiments are necessarily essential to the means for solving the problems.

Embodiment 1

First, a brief outline of a virtual viewpoint image is given. There is a technique for generating a virtual viewpoint image seen from a virtual viewpoint which is not dependent on a camera's viewpoint, by using multi-viewpoint images captured synchronously from a plurality of viewpoints of a plurality of cameras installed at different positions. This technique allows a viewer to view, for example, the highlights of a soccer game from various angles, enabling the viewer to experience the game in a livelier way than with regular images. In the present embodiment, a virtual viewpoint image is what is also called a free viewpoint image, but includes not only an image corresponding to the viewpoint designated by the user, but also, for example, an image corresponding to a viewpoint selected by the user from a plurality of candidates. Note that a virtual viewpoint image may be a video or a still image. The embodiments described below assume that a virtual viewpoint image is a video (also referred to as a virtual viewpoint video).

[System Configuration]

Figure 1:
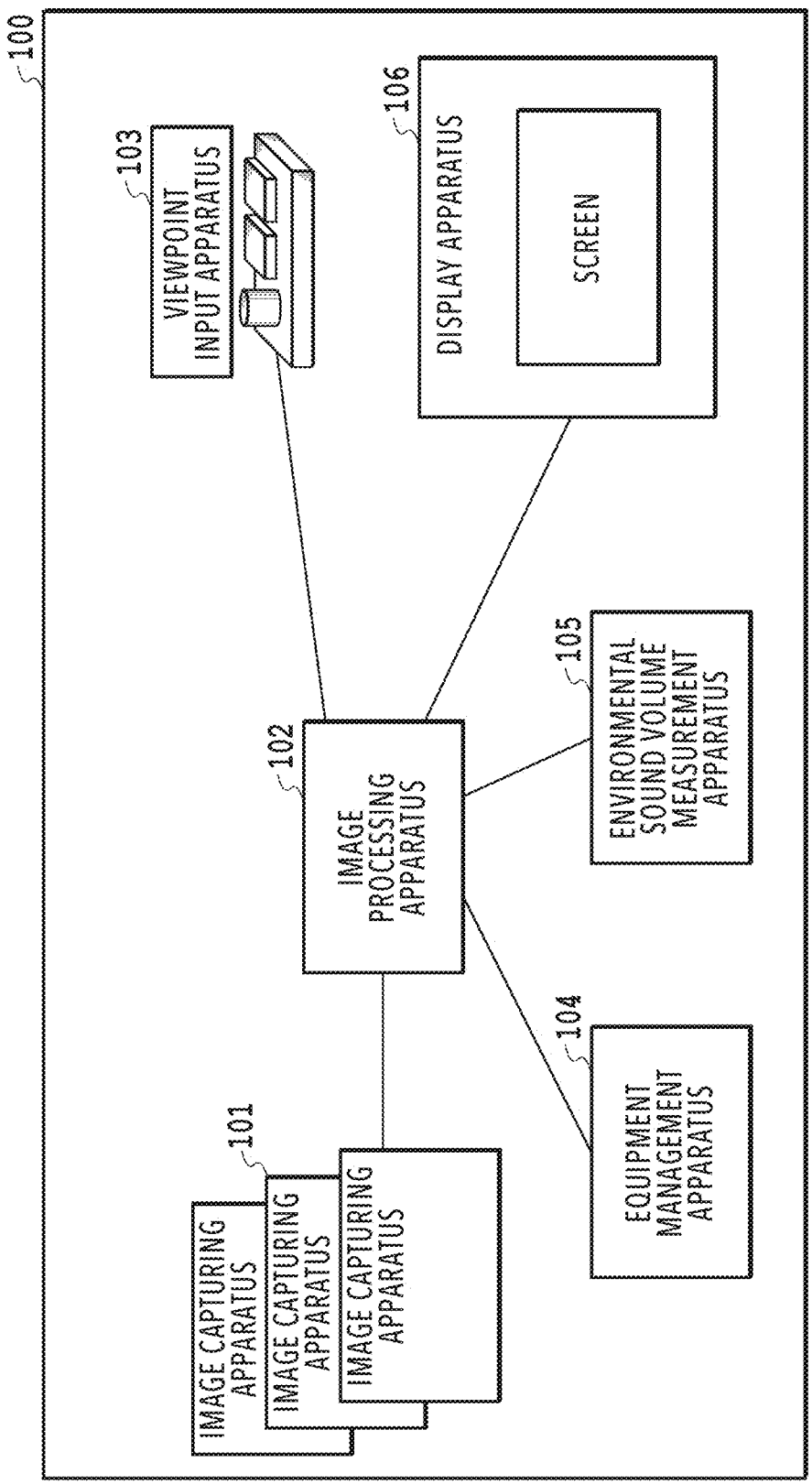
FIG. 1 is a diagram showing a schematic configuration of an image processing system.

FIG. 1 is a diagram showing the configuration of an image processing system for generating a virtual viewpoint image of the present embodiment. An image processing system 100 has a plurality of image capturing apparatuses 101, an image processing apparatus 102, a viewpoint input apparatus 103, an equipment management apparatus 104, an environmental sound volume measurement apparatus 105, and a display apparatus 106. The image processing system 100 is a system that, based on a plurality of captured images captured by the image capturing apparatuses and a designated virtual viewpoint, generates a virtual viewpoint image which shows what it looks like from the designated viewpoint. An image-capturing region captured by the image capturing apparatuses is, for example, a stadium where a sporting competition such as a rugby or soccer game takes place or a stage where a concert or a play is performed.

The image capturing apparatuses 101 are installed at different positions surrounding the image-capturing region such as a stadium, and capture the image-capturing region in time synchronization with one another. The image capturing apparatuses 101 do not have to be installed over the entire periphery of the image-capturing region, and may be installed only at positions directed to a part of the image-capturing region in a case where there are restrictions as to the installment locations of the image capturing apparatuses. Also, the number of image capturing apparatuses is not limited to the example shown in FIG. 1, and for example, in a case where the image-capturing region is a soccer stadium, it is preferable that thirty or so image capturing apparatuses are installed around the stadium. Further, image capturing apparatuses with different functions, such as a combination of telephotographic cameras and wide-angle cameras, may be installed.

The image capturing apparatuses 101 are each implemented by, for example, a digital video capturing apparatus equipped with a video signal interface, typified by a serial digital interface (SDI). The image capturing apparatus 101 adds time information, typified by a timecode, to a video signal to output, and sends the video signal to the image processing apparatus 102.

The image processing apparatus 102 creates a virtual viewpoint image based on the captured images captured by the image capturing apparatus 101. The image processing apparatus 102 obtains image data on the captured images from the image capturing apparatuses 101 via network cables or the like. Based on the image data thus obtained, the image processing apparatus 102 performs processing such as generation of three-dimensional shape data and rendering of objects, thereby generating a virtual viewpoint image. Further, the image processing apparatus 102 performs processing to display a virtual content on the virtual viewpoint image thus generated. The functions of the image processing apparatus 102 will be detailed later.

The viewpoint input apparatus 103 is an input apparatus which has a controller such as a joystick and is used by a user to input viewpoint information on a virtual viewpoint. The viewpoint information inputted through the viewpoint input apparatus 103 is sent to the image processing apparatus 102.

Data indicating the viewpoint information include, for example, X-axis, Y-axis, and Z-axis parameters indicating the position of a virtual viewpoint in a three-dimensional coordinate system, pan, tilt, and roll parameters indicating the orientation at the virtual viewpoint, the size of the field of view (the angle of view), and a resolution. The contents of the viewpoint information are not limited to the ones given above. The viewpoint information is calculated following a publicly known camera calibration procedure and stored. For example, viewpoint information is calculated through geometric calculation by associating points in respective images captured by the image capturing apparatuses 101 to one another. The viewpoint information may have a plurality of parameter sets. For example, viewpoint information may be information having a plurality of parameter sets corresponding to respective frames constituting a video, and indicating the position and direction of a virtual viewpoint at each timepoint.

The display apparatus 106 is a display unit that displays a virtual viewpoint image containing a virtual content. The display apparatus 106 obtains image data on a virtual viewpoint image from the image processing apparatus 102, and displays the virtual viewpoint image. The display apparatus 106 is implemented by, for example, a liquid crystal display or an LED.

The equipment management apparatus 104 is an apparatus that controls electronic signs which are displays (display devices) installed in an image-capturing region of the image capturing apparatuses 101, such as stadium. In the present embodiment, a content displayed on an electronic sign is an advertising image or video, and the equipment management apparatus 104 controls each electronic sign so that the advertisement displayed thereon changes at predetermined intervals.

The environmental sound volume measurement apparatus 105 is an apparatus that measures the sound volume of the image-capturing region of the image capturing apparatuses 101. For example, in a case where the image-capturing region is a stadium, the environmental sound volume measurement apparatus 105 is installed near the spectators' seats and measures the sound volume during a game of a soccer, a rugby, or the like. Sound volume data containing a value indicative of the sound volume measured is sent to the image processing apparatus 102. Two or more environmental sound volume measurement apparatuses 105 may be installed to increase the accuracy of measuring the sound volume of the spectators at a stadium, or only one environmental sound volume measurement apparatus 105 may be installed at the center part of the stadium. Note that the environmental sound volume measurement apparatus 105 is used in Embodiment 2 to be described later. Thus, the configuration of the image processing system 100 of the present embodiment does not have to include the environmental sound volume measurement apparatus 105.

[Hardware Configuration]

Figure 2:
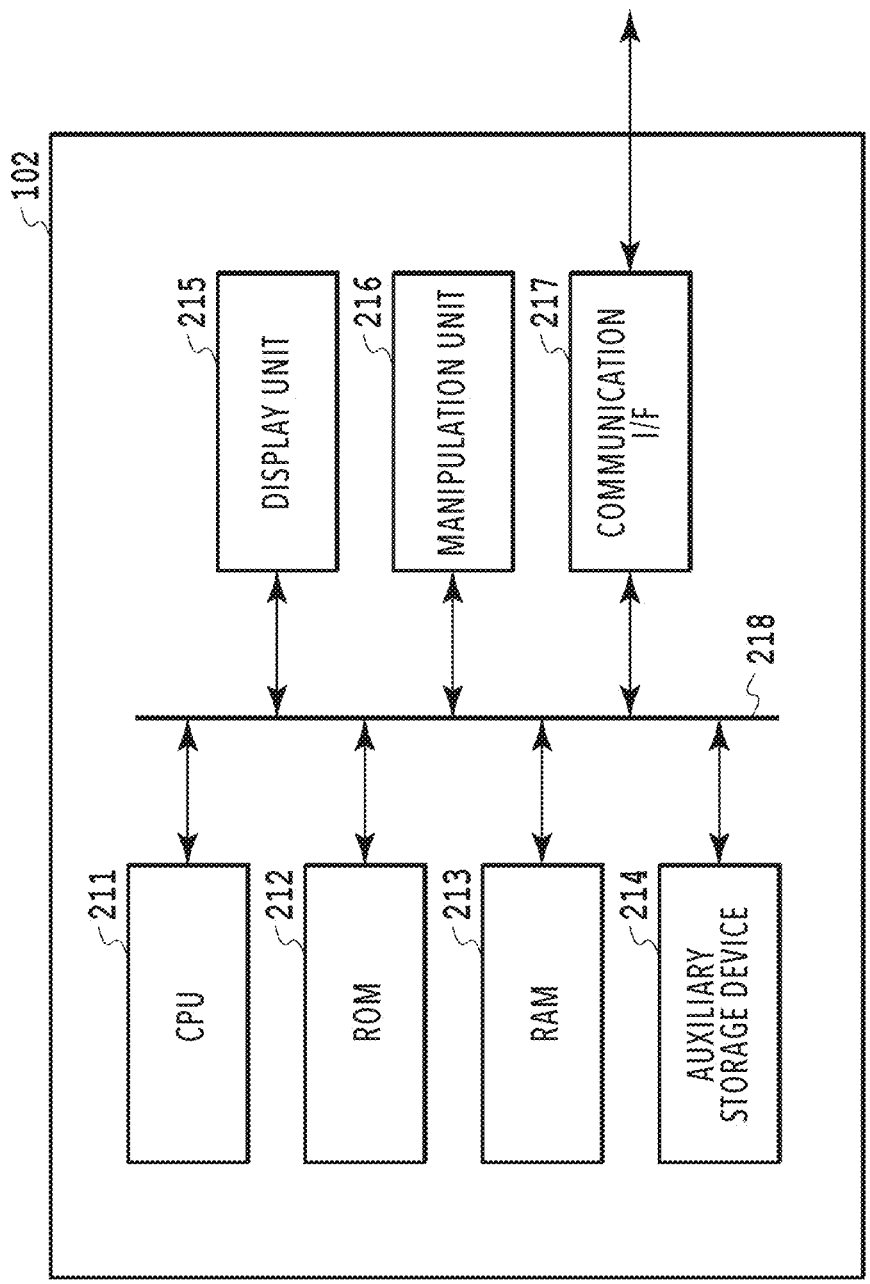
FIG. 2 is a diagram showing a hardware configuration of an image processing apparatus.

FIG. 2 is a diagram showing a hardware configuration of the image processing apparatus 102. The image processing apparatus 102 has a CPU 211, a ROM 212, a RAM 213, an auxiliary storage device 214, a display unit 215, a manipulation unit 216, a communication interface (I/F) 217, and a bus 218. The CPU 211 implements the functions of the image processing apparatus 102 by performing overall control of the image processing apparatus 102 using computer programs and data stored in the ROM 212 or the RAM 213. Note that the image processing apparatus 102 may have one or more dedicated hardware components or a graphics processing unit (GPU) besides the CPU. Then, at least part of processing by the CPU may be performed by the GPU or the dedicated hardware. Examples of the dedicated hardware components include an application-specific integrated circuit (ASIC), a field-programmable gate array (FPGA), and a digital signal processor (DSP).

The ROM 212 stores programs and the like that do not need changes. The RAM 213 temporarily stores programs and data supplied from the auxiliary storage device 214, data externally supplied via the communication I/F 217, and the like. The auxiliary storage device 214 is configured with, for example, a hard disk drive or the like, and stores various kinds of data such as image data and sound volume data.

The display unit 215 is configured with, for example, a liquid crystal display or a LED, and displays, for example, a graphical user interface (GUI) used by a user to manipulate the image processing apparatus 102. The manipulation unit 216 is configured with, for example, a keyboard, a mouse, a joystick, a touch panel, and/or the like, and inputs various kinds of instructions to the CPU 211 as manipulated by the user. The CPU 211 operates as a display control unit that controls the display unit 215 and as a manipulation control unit that controls the manipulation unit 216. The communication I/F 217 is used for communications between the image processing apparatus 102 and the outside.

For example, in a case where the image processing apparatus 102 is connected with an external apparatus in a wired manner, a communication cable is connected to the communication I/F 217. In a case where the image processing apparatus 102 has a capability of wirelessly communicating with an external apparatus, the communication I/F 217 includes an antenna. The bus 218 connects the units of the image processing apparatus 102 to one another and allows information to be communicated thereamong. In the present embodiment, the display unit 215 and the manipulation unit 216 are located within the image processing apparatus 102, but instead, at least one of the display unit 215 and the manipulation unit 216 may be located outside the image processing apparatus 102 as a separate apparatus.

[Electronic Signs and Virtual Contents]

Figure 3:
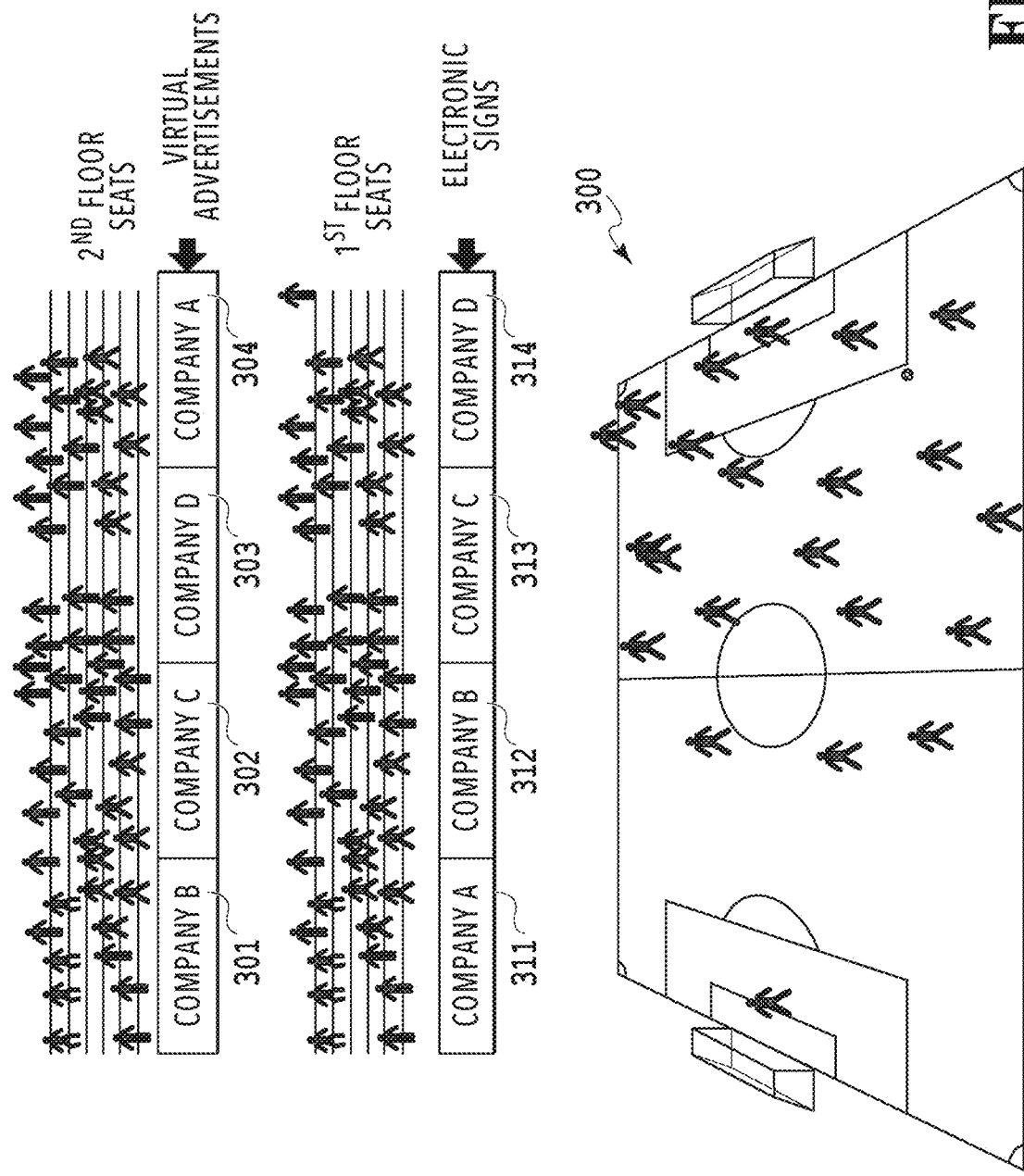
FIG. 3 is a diagram illustrating electronic signs and virtual advertisements.

FIG. 3 is a diagram showing a virtual viewpoint image displayed on the display apparatus 106. The virtual viewpoint image in FIG. 3 is generated based on images synchronously captured by the image capturing apparatuses installed in a stadium where a soccer game is taking place. The virtual viewpoint image in FIG. 3 includes electronic signs 311 to 314 and virtual advertisements 301 to 304 which are virtual contents.

The electronic signs 311 to 314 are display devices, such as displays, that are actually installed in a stadium, which is an image-capturing region, to display predetermined contents. The description of the present embodiment assumes that an electronic sign is a display device that displays an advertisement, and that advertisements displayed on the electronic signs 311 to 314 are controlled to change on a time basis.

By contrast, a virtual content does not actually exist in the stadium as an image-capturing region, i.e., is not included in captured images. A virtual content is a content such as a video or an image which is displayed with a virtual viewpoint image by processing of the virtual viewpoint image, and can be seen by a viewer on the virtual viewpoint image. The following description of the embodiment assumes that an advertisement content is displayed as a virtual content. A virtual advertisement content is referred to as a virtual advertisement. In the present embodiment, a virtual advertisement is displayed so that the contents of the advertisement change on a time basis to enhance the advertising effectiveness.

In the virtual viewpoint image in FIG. 3, advertisement displays are installed on the side of a field 300 as the electronic signs 311 to 314. On the second floor of the stadium, there are virtual content regions for displaying virtual contents, and the virtual advertisements 301 to 304 are displayed there. In this way, there are cases where both electronic signs and virtual advertisements are contained and displayed within the virtual viewpoint image.

As described earlier, the electronic signs and the virtual advertisements are displayed so that the advertisement contents change on a time basis. Thus, if an advertisement displayed on an electronic sign and a virtual advertisement change at different timings in a virtual viewpoint image, the attention of the viewer may be drawn to the frequently-changing advertisements, making it hard for the viewer to focus on the region on the virtual viewpoint image other than the advertisements. To address this concern, in the present embodiment, a description is given of a method for performing control such that virtual advertisements are displayed in synchronization with electronic signs to make the advertisements less visually distracting.

[Functional Configuration]

Figure 4:
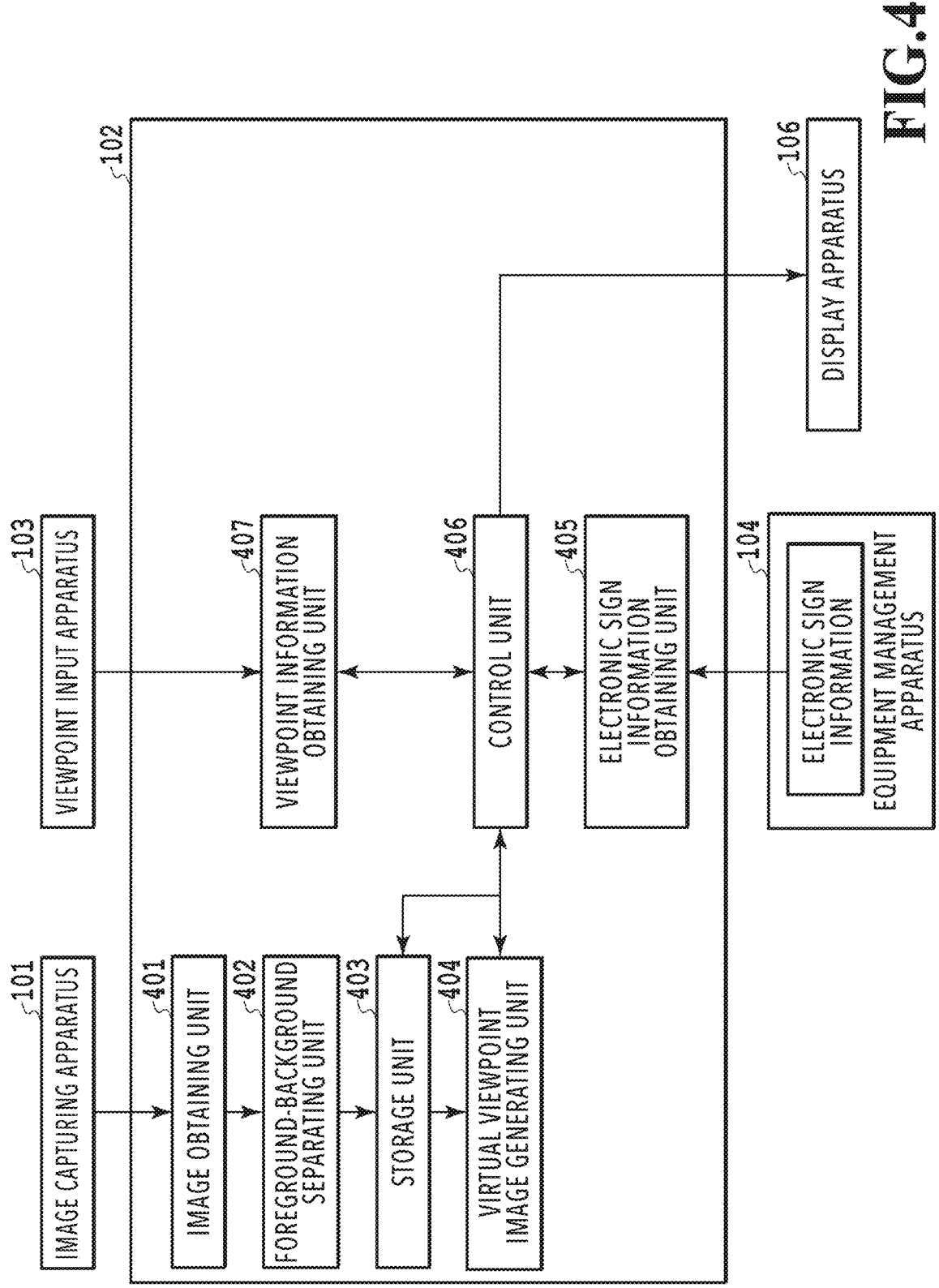
FIG. 4 is a block diagram showing a functional configuration of the image processing apparatus.

FIG. 4 is a block diagram showing a functional configuration of the image processing apparatus 102. The image processing apparatus 102 has an image obtaining unit 401, a foreground-background separating unit 402, a storage unit 403, a virtual viewpoint image generating unit 404, an electronic sign information obtaining unit 405, a viewpoint information obtaining unit 407, and a control unit 406.

The image obtaining unit 401 obtains image data on captured images captured by the image capturing apparatuses 101.

The foreground-background separating unit 402 extracts particular objects, such as players and referees, from each of the images captured by the image capturing apparatuses 101. The foreground-background separating unit 402 causes images of the thus-extracted particular objects to be stored as particular object images.

A method for extracting particular objects from a captured image is not limited to any particular method. The background difference method is one example of the methods for extracting particular objects. In the background difference method, particular objects are extracted based on a comparison between pixel values in a captured image with those in a background image corresponding to the captured image. A background image is an image of an image-capturing region in which particular objects do not exist. An image used as a background image can be obtained by, for example, in a case where the image-capturing region is a stadium, capturing the stadium before the sporting competition starts, where no particular objects exist.

The foreground-background separating unit 402 causes the background image and the particular object images to be stored along with image-capturing position information indicating the image-capturing positions (three-dimensional positions) of the image capturing apparatuses. The three-dimensional position is defined by the positions in terms of the height direction, the width direction, and the depth direction of the image capturing space. Image-capturing position information in a world coordinate system can be obtained by, for example, capturing pre-installed markers or the like and performing three-dimensional image measurement or the like on the markers.

The viewpoint information obtaining unit 407 obtains a transmission signal outputted from the viewpoint input apparatus 103 based on the input made by a user. The viewpoint information obtaining unit 407 generates viewpoint information based on the transmission signal obtained. Viewpoint information is composed of position information (x,y,z) indicating the position of a virtual viewpoint and direction information (rx,ry,rz) indicating the orientation at the virtual viewpoint. The viewpoint information is obtained by adding or subtracting an amount of change included in user manipulation information to or from pre-change viewpoint information, the change being based on, for example, the center of the stadium as a point of origin.

The virtual viewpoint image generating unit 404 generates three-dimensional shape data on particular objects based on particular object images. The method for generating three-dimensional shape data is not limited to a particular method. For example, three-dimensional shape data is generated by volume intersection method. Further, the position and the size of each particular object in the image capturing space is identified. The virtual viewpoint image generating unit 404 generates a virtual viewpoint image from the virtual viewpoint by reflecting the position and the size of each particular object. A virtual viewpoint image may be a computer graphics image as seen from a set virtual viewpoint, generated using the three-dimensional shape data on the particular objects. Any appropriate publicly known technique may be used for this generation processing.

Note that the description of the present embodiment assumes that a virtual viewpoint image is generated by the image obtaining unit 401, the foreground-background separating unit 402, the viewpoint information obtaining unit 407, and the virtual viewpoint image generating unit 404 in the image processing apparatus 102. Alternatively, a virtual viewpoint image may be generated by other one or more image processing apparatuses including functions similar to the image obtaining unit 401, the foreground-background separating unit 402, the viewpoint information obtaining unit 407, and the virtual viewpoint image generating unit 404. In such a case, the image processing apparatus 102 obtains data on a virtual viewpoint image generated by the other apparatus.

The description herein assumes that a virtual viewpoint image displayed is in accordance with the position, orientation, and the like of the virtual viewpoint designated by a user or the like. However, the virtual viewpoint image may be generated according to a moving path of a predetermined virtual viewpoint.

The equipment management apparatus 104 stores information indicating how each electronic sign installed in the image-capturing region of the image capturing apparatuses 101 is to be controlled (electronic sign information), such as the contents of advertisements to be displayed on the electronic sign, the order in which the advertisements are displayed, the intervals, the date of execution, the start time, the end time, and sponsor information. The electronic sign information obtaining unit 405 obtains the electronic sign information from the equipment management apparatus 104.

FIG. 5 is a diagram illustrating electronic sign information 500. In the present embodiment, the electronic sign information 500 is a table managing advertisement contents, such as videos, to be displayed on each electronic sign and other information such as the order in which the advertisement contents are displayed. In the present embodiment, the electronic sign information 500 retains information on each of the electronic signs 311 to 314 in rows 501 to 504, respectively. Information on each electronic sign retained in the electronic sign information 500 is display contents 505, display order 506, intervals 507, date of execution 508, start time 509, end time 510, and sponsor information 511.

The display contents 505 retains file names of advertisement contents, such as videos, to be used and displayed on the electronic sign. For example, company A.mp4 is the file name of an advertisement video by a sponsor company A. The advertisement video contains, for example, a company logo, a product logo, a product image, and the like. The advertisement content may also be image data on a still image.

The display order 506 indicates the order in which the advertisements retained in the display contents 505 are displayed. For example, the display order 506 for the electronic sign 311 indicates that the electronic sign 311 displays the advertisement contents in the order of company A, company B, company C, and company D and that these four advertisement contents are displayed as one loop.

The intervals 507 indicates the time it takes to display the one loop of advertisements retained in the display order 506. For example, in a case of the electronic sign 311 in the row 501, "60 seconds" is retained as the intervals 507. The four advertisement contents are displayed in one loop in the order indicated by the display order 506. For this reason, the electronic sign 311 displays the advertisement by company A at the start time for 15 seconds, then displays the advertisement by company B for 15 seconds, then displays the advertisement by company C for 15 seconds, and then displays the advertisement by company D for 15 seconds. The display order 506 indicates that display control is performed such that after the advertisement by company D is displayed, the loop goes back to the first advertisement, and the advertisement by company A is displayed for 15 seconds.

The date of execution 508 indicates the date of displaying the electronic sign 311 to 314. The start time 509 and the end time 510 indicate the start time and the end time of displaying the electronic sign 311 to 314. For example, assuming that the electronic signs 311 to 314 are advertising displays installed in a stadium, the date of execution 508 retains the data on which, for example, a soccer game takes place in the stadium. Further, the start time of the game and the end time of the game are retained as the start time and the end time, respectively. The sponsor information 511 retains the names of the sponsors of the advertisements for the electronic sign.

Note that the electronic sign information obtained by the electronic sign information obtaining unit 405 is not limited to the format of the electronic sign information 500. The electronic sign information may be in any format as long as the timings for changing the contents displayed on the electronic signs can be derived therefrom. Referring back to FIG. 4, the description of the functions of the image processing apparatus 102 is continued.

The control unit 406 obtains data on a virtual viewpoint image and determines the positions of virtual content regions, which are regions to display virtual contents, in a three-dimensional space of the virtual viewpoint image. Further, the control unit 406 controls, for instance, the timings for displaying virtual advertisements based on the electronic sign information 500. For example, the control unit 406 controls how the virtual advertisements are displayed so that the advertisement contents may be displayed in synchronization with the electronic signs 311 to 314. Details will be given later.

The control unit 406 outputs image data on a virtual viewpoint image generated and time information to the display apparatus 106 and controls the display apparatus 106 so that the display apparatus 106 displays the virtual viewpoint image. The outputted data may be three-dimensional shape information and texture information necessary for rendering, or data on a virtual viewpoint image in which a virtual viewpoint is determined.

The above-described functions of the units in FIG. 4 are implemented by the CPU of the image processing apparatus 102 loading the program code stored in the ROM or an external storage device onto the RAM and executing the program code. Alternatively, some or all of the above-described functions may be implemented by hardware such as an ASIC or an electronic circuit.

The storage unit 403 stores a background image and particular object images. The storage unit 403 also stores content data such as images to be displayed as virtual advertisements. The content data is, for example, image data or video data containing a company logo, a product logo, a product image, and/or the like, but is not limited to such an example.

[Flowchart]

Figure 6:
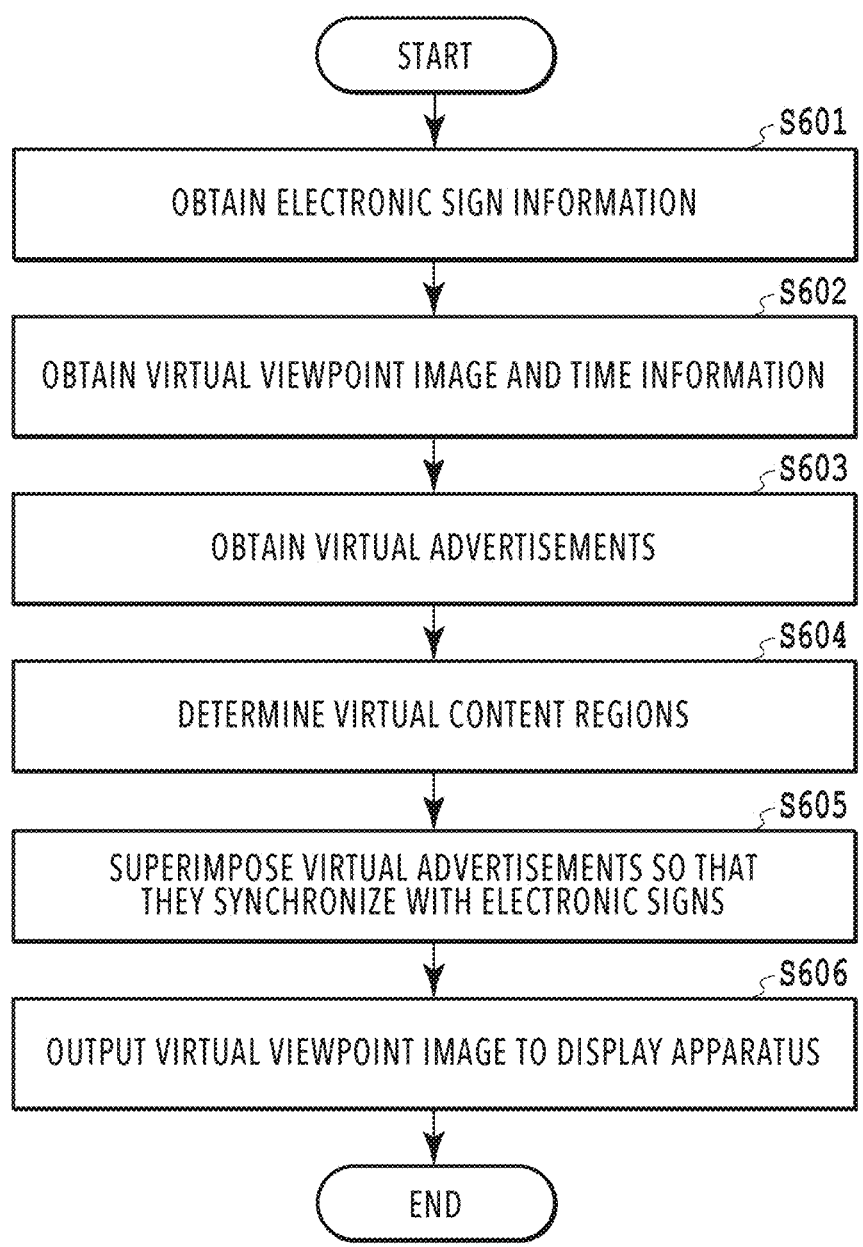
FIG. 6 is a flowchart showing processing of superimposing virtual advertisements on a virtual viewpoint image.

FIG. 6 is a flowchart showing example processing of virtual advertisement display control performed by the image processing apparatus 102. The series of processing shown in the flowchart in FIG. 6 is performed by the CPU of the image processing apparatus 102 loading the program code stored in the ROM onto the RAM and executing the program code. Some or all of the functions of the steps in FIG. 6 may be implemented by hardware such as an ASIC or an electronic circuit. Note that the letter "S" used in the description of each processing denotes a step in the flowchart, and this applies to the flowchart given further below.

Before this flowchart starts or in parallel with the processing by this flowchart, a virtual viewpoint image is generated by the image obtaining unit 401, the foreground-background separating unit 402, and the virtual viewpoint image generating unit 404.

In S601, the electronic sign information obtaining unit 405 obtains information indicative of the timings for changing the contents to be displayed on electronic signs installed within the image-capturing region of the image capturing apparatuses 101. In the present embodiment, the electronic sign information obtaining unit 405 obtains the electronic sign information 500.

In S602, the control unit 406 obtains data on the virtual viewpoint image where virtual advertisements are to be superimposed and data on time information on the virtual viewpoint image. The time information on the virtual viewpoint image is, for example, time information indicative of the image-capturing time added to the captured images used for the generation of the virtual viewpoint image.

In S603, the control unit 406 obtains, from the storage unit 403, data on advertisement contents to be superimposed on the virtual viewpoint image as virtual advertisements. In S604, the control unit 406 determines the positions of the virtual content regions to dispose the virtual advertisements in the three-dimensional space of the virtual viewpoint image.

In S605, based on the electronic sign information 500 obtained by the electronic sign information obtaining unit 405, the control unit 406 derives the timing at which the advertisements (advertisement contents) displayed on the electronic signs change. The control unit 406 performs processing such that the virtual advertisements may be displayed on the virtual content regions in synchronization with the advertisements on the electronic signs.

Herein, synchronization means either controlling the content-changing timing for the virtual advertisements so that it agrees with that of the electronic signs (this synchronization is referred to as timing synchronization) or controlling the content-changing timing and the contents of the virtual advertisements so that they agree with those of the electronic signs (this synchronization is referred to as content synchronization).

Figure 7:
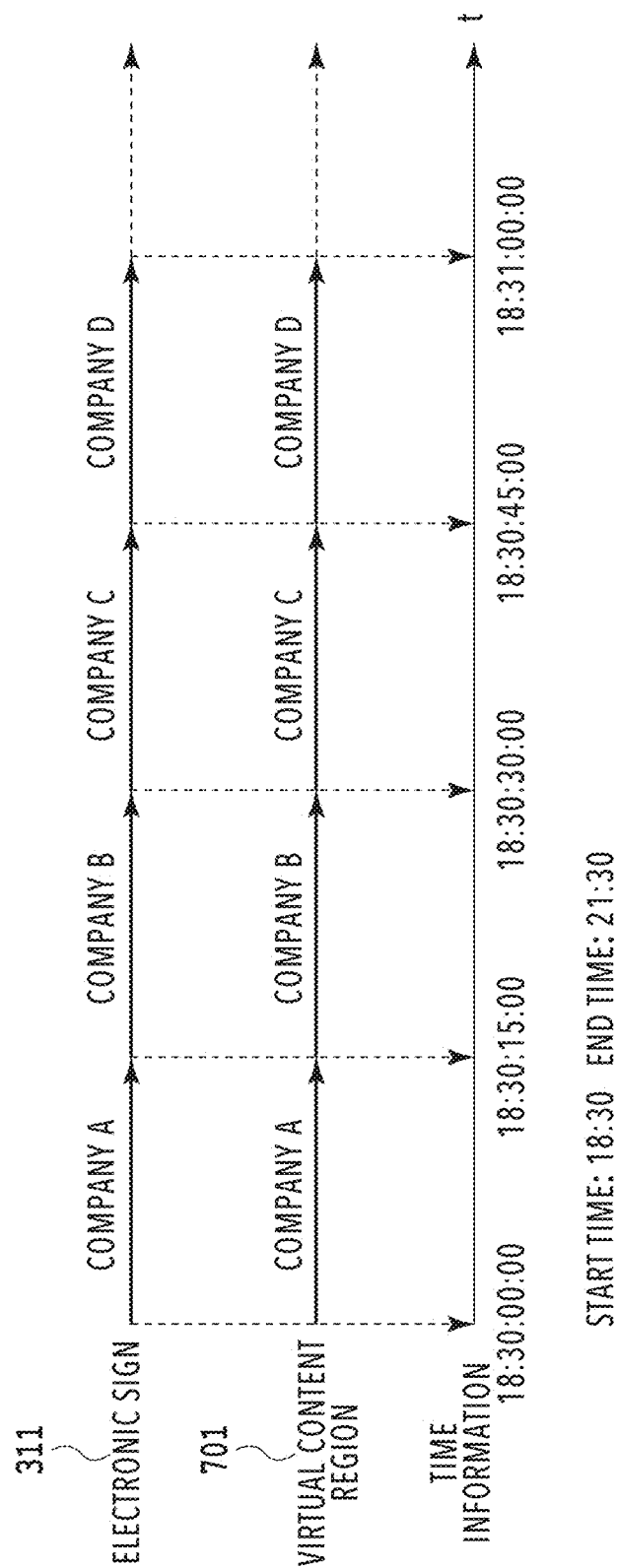
FIG. 7 is a sequence diagram depicting a case where virtual advertisements are controlled in synchronization with electronic signs.

FIG. 7 is a sequence diagram illustrating how virtual advertisements are displayed in content synchronization with the advertisements on the electronic signs. The electronic sign 311 is an electronic sign the display of which is controlled based on the sign information shown in the column 501 in FIG. 5. FIG. 7 shows how the electronic sign 311 starts displaying advertisements (advertisement contents) at the start time 18:00 and changes the advertisements every 15 seconds, displaying the advertisements in the order of company A, company B, company C, and company D.

A virtual content region 701 is a virtual content region controlled by the control unit 406 so that a virtual advertisement may be displayed in content synchronization with the electronic sign 311, that is, so that the same advertisement as the one on the electronic sign 311 may be superimposed and displayed at the same advertisement-switching timing as the electronic sign 311. The control unit 406 derives, based on the electronic sign information 500 in FIG. 5, the tuning at which the advertisements on the electronic sign 311 change, and virtual contents are superimposed on the virtual content region 701, using the same display contents 505, display order 506, and intervals 507 as those used for the electronic sign 311. For this reason, as shown in FIG. 7, the virtual content region 701 displays, as virtual advertisements, advertisements by the same sponsors as the advertisements displayed on the electronic sign 311, in the same display order used for the electronic sign 311. Note that even in a case of content synchronization, contents for virtual advertisements different from the contents indicated by the display contents 505 may be superimposed as virtual advertisements.

The virtual content region 701 displays virtual advertisements in content synchronization with the electronic sign 311 based on the electronic sign information on the electronic sign 311. Thus, the advertisements by companies A to D are superimposed and displayed as virtual advertisements in the order of company A, company B, company C, and company D, starting at the start time 18:00 and switching every 15 seconds. Having the same content-changing timing as the electronic signs, the virtual advertisements can be made less visually distracting.

Figure 8:
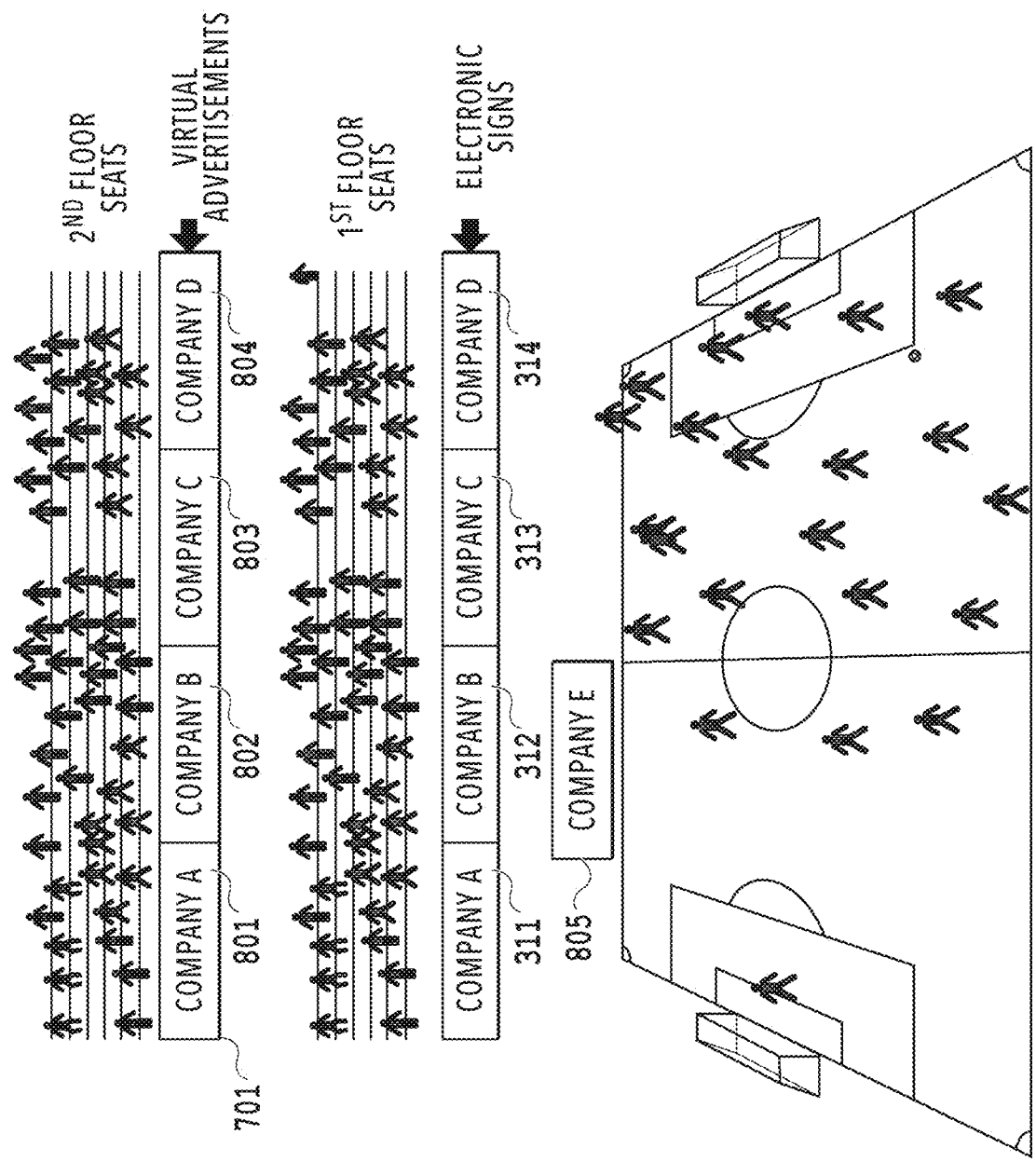
FIG. 8 is a diagram illustrating electronic signs and virtual advertisements.

FIG. 8 is a diagram showing a virtual viewpoint image on which virtual advertisements are superimposed and displayed in content synchronization with the electronic signs. In the example in FIG. 8, virtual advertisements in each virtual content region are displayed in content synchronization with the electronic sign closest to the virtual content region. For example, in the virtual content region 701, a virtual advertisement 801 is displayed in content synchronization with the advertisement on the electronic sign 311. In a case where there are a plurality of electronic signs 311 to 314 that display advertisements as controlled differently from one another, it is preferable that each virtual advertisement be displayed in synchronization with the advertisement on the electronic sign which is closest to or within a predetermined range from its virtual content region. Such control can enhance the effectiveness of making virtual advertisements less visually distracting.

Note that a virtual advertisement 805 in FIG. 8 is an advertisement superimposed in a virtual content region determined based on the positions of objects such as players and referees. For example, such a virtual content region may be determined at a position not overlapping with objects such as players or referees so that the region can be easily viewed by the viewer. The virtual advertisement 805 is controlled not to switch at predetermined intervals. In this way, the virtual viewpoint image may contain a virtual advertisement which does not synchronize with any electronic sign and displays a single advertisement.

A method for displaying a virtual advertisement in synchronization with an advertisement on an electronic sign is not limited to a particular method. For example, the control unit 406 obtains data on advertisement contents by each sponsor and generates virtual advertisement contents that switch at the same timing as the advertisements on the electronic signs 311 to 314. Then, the control unit 406 may dispose the thus-generated contents on the virtual content regions as virtual advertisements. The control unit 406 may obtain advertisement contents generated so as to switch at the same timing as the advertisements on the electronic signs 311 to 314 from the storage unit and dispose the obtained contents in the virtual content regions as virtual advertisements.

Alternatively, the control unit 406 may perform the following control. Specifically, the control unit 406 obtains contents generated so that a plurality of advertisement contents are looped. Then, the control unit 406 sets the start time and the intervals of the contents so that the advertisements may change at the same time intervals as those on the electronic signs. The control unit 406 then superimposes the thus-set contents over the virtual content regions so that the virtual advertisements and the advertisements on the electronic signs may synchronize with each other.

Alternatively, in a case where an electronic sign and a virtual content region are within the angle of view of a virtual viewpoint, the control unit 406 may perform the following control. Specifically, the control unit 406 obtains, from the storage unit 403, an advertisement content by the same sponsor as the advertisement to be displayed on the electronic sign. The control unit 406 outputs an advertisement content to be displayed as a virtual advertisement to the display apparatus 106, so that the virtual advertisement will be superimposed and displayed on the virtual content region. In another possible method, the electronic sign information obtaining unit 405 may obtain a synchronization signal from the equipment management apparatus 104 in place of the electronic sign information 500, and the control unit 406 may perform control based on the synchronization signal so that the virtual advertisement may be displayed in synchronization with the electronic sign.

As described above, the control unit 406 may control how virtual advertisements are displayed, using timing synchronization control, in which an advertisement displayed as a virtual advertisement is changed at the same timing as an advertisement on an electronic sign.

FIG. 9 is a diagram showing a virtual viewpoint image on which virtual advertisements 901 to 904 by different sponsors from the advertisements on the electronic signs 311 to 314 are displayed. Virtual content regions display the virtual advertisements 901 to 904 by company W, company X, company Y, and company Z, which are sponsors different from the advertisements displayed on the electronic signs 311 to 314, hut the virtual advertisements are displayed in timing synchronization with the electronic signs. Even if the virtual advertisements are different from the advertisements displayed on the electronic signs 311 to 314, timing synchronization control, which causes the virtual advertisements to change at the same timing as the electronic signs 311 to 314, can make the virtual advertisements less visually distracting to the viewer.

In S606, the control unit 406 outputs the virtual viewpoint image having the virtual advertisements inserted thereto to the display apparatus 106.

According to the present embodiment described above, how virtual advertisements are superimposed is controlled based on the electronic signs, i.e., the virtual advertisements are displayed in synchronization with the electronic signs. Thus, the present embodiment can make virtual contents such as virtual advertisements less visually distracting to the viewer.

Note that a virtual content is not limited to a virtual advertisement. For example, information such as results of other games and player information may also be superimposed as virtual contents. In such a case as well, it is possible to make switching of virtual contents less visually distracting to the viewer by causing the displayed virtual contents to switch at the same timing as what is displayed on the electronic signs.

Further, although the description of the present embodiment uses an example of a virtual viewpoint image of a stadium where a soccer game or the like takes place, the present embodiment is also applicable to other virtual viewpoint images. For example, in a case where virtual contents are to be displayed on a virtual viewpoint image of a city where electronic signs are installed, the method of the present embodiment may be used to display the virtual contents in synchronization with the electronic signs.

Further, although the description of the present embodiment assumes that contents with which virtual contents synchronize are contents displayed on electronic signs in the image-capturing region, additionally, the contents may synchronize with other kinds of signs in an image-capturing region, such as display devices that change what is displayed thereon on a time basis. For example, a virtual content may be controlled to change at the same timing as switching of what is displayed on a split-flap display which is controlled to flip at a certain time.

Embodiment 2

In Embodiment 1, a description has been given of a method for synchronizing a virtual advertisement with an electronic sign so that the virtual advertisement may not disturb the viewer's viewing experience. However, there are scenes where it is desirable to increase the advertising effectiveness, such as a goal scene in a soccer game. In such a scene, it is preferable that a virtual advertisement be conspicuously displayed on the virtual viewpoint image.

To this end, in the present embodiment, a description is given of a method for switching virtual advertisement displaying methods based on sound information in an image-capturing region such as a stadium. In the present embodiment, differences from Embodiment 1 are mainly described. Embodiment 2 has the same configurations and performs the same processing as Embodiment 1 if they are not described specifically here.

Figure 10:
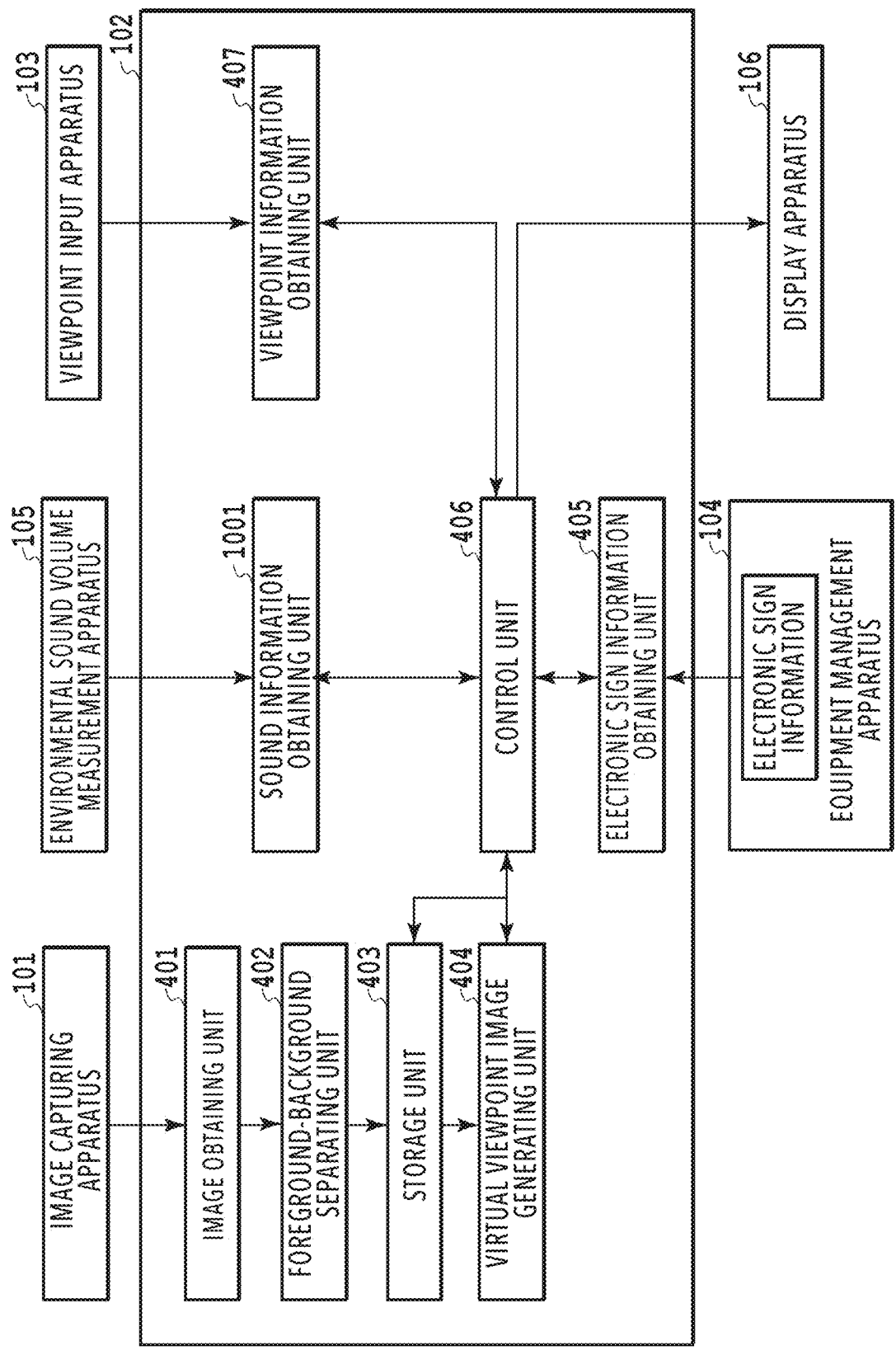
FIG. 10 is a block diagram showing a functional configuration of the image processing apparatus.

FIG. 10 is a block diagram showing a functional configuration of the image processing apparatus 102 of the present embodiment. The same processing blocks as those in Embodiment 1 are denoted by the same numbers as those used in Embodiment 1 and are not described here. The image processing apparatus 102 of the present embodiment further has a sound information obtaining unit 1001.

The sound information obtaining unit 1001 obtains sound information from the environmental sound volume measurement apparatus 105. The environmental sound volume measurement apparatus 105 measures the sound volume of the stadium where the image capturing apparatuses 101 of the image processing system are installed. The environmental sound volume measurement apparatus 105 may be a commonly used noise meter. The following description assumes that the environmental sound volume measurement apparatus 105 of the present embodiment is an apparatus that outputs sound volume data indicating sound volume in dB as sound information. The sound information obtaining unit 1001 obtains sound information outputted from the environmental sound volume measurement apparatus 105 via a network.

Figure 11:
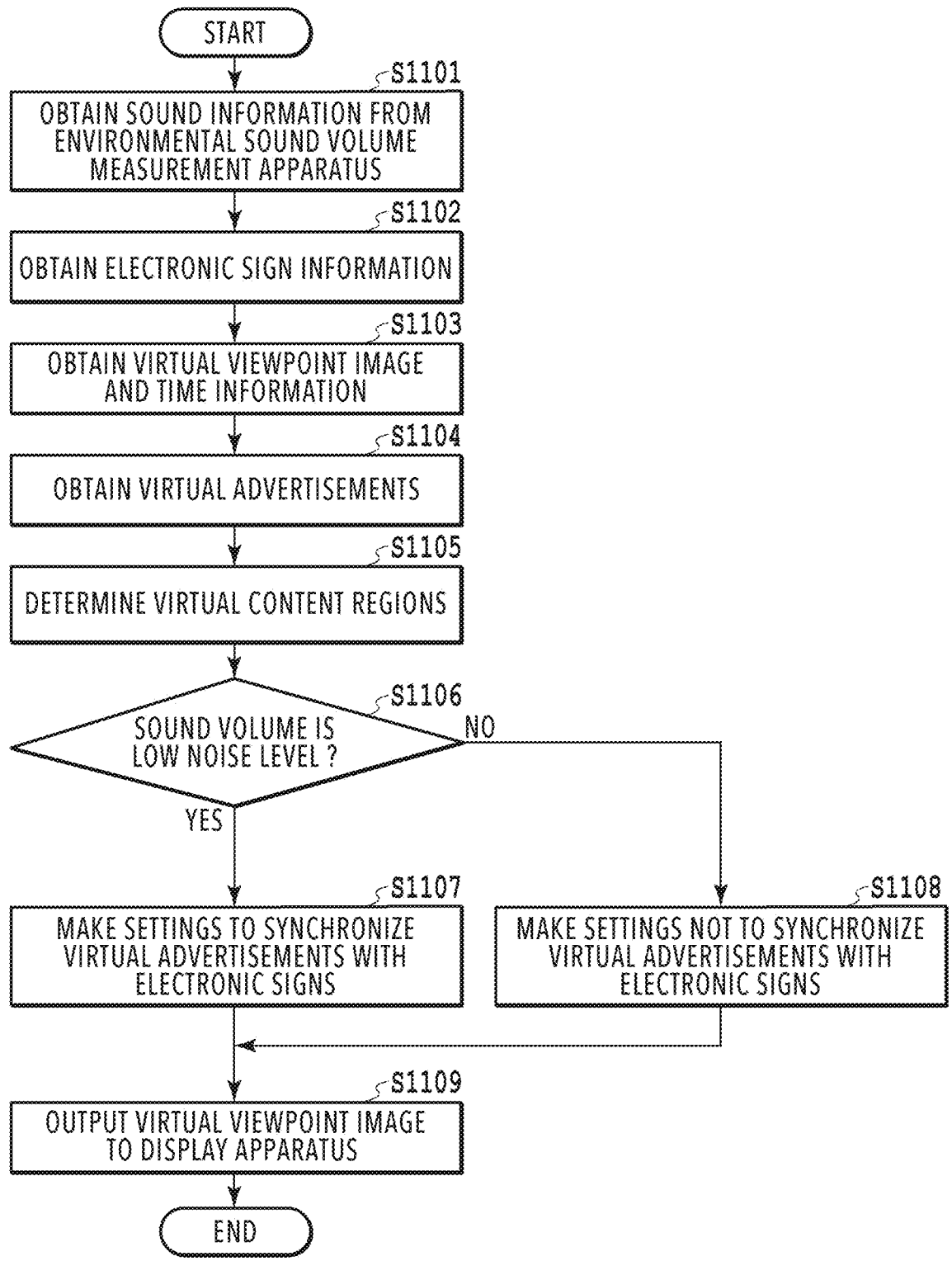
FIG. 11 is a flowchart showing processing of superimposing virtual advertisements on a virtual viewpoint image.

FIG. 11 is a diagram showing an example flowchart illustrating virtual advertisement displaying processing performed by the image processing apparatus 102 of the present embodiment. Note that before this flowchart starts, a virtual viewpoint image is generated by the image obtaining unit 401, the foreground-background separating unit 402, and the virtual viewpoint image generating unit 404. Alternatively, the virtual viewpoint image generation processing may be performed in parallel with the processing of this flowchart.

In S1101, the sound information obtaining unit 1001 obtains sound information in an image-capturing region of the image capturing apparatuses 101 of the image processing system 100 from the environmental sound volume measurement apparatus 105 installed in the image-capturing region.

S1102 to S1105 are the same as S601 to S604, and are therefore not described here.

In S1106, the control unit 406 determines whether the sound level at the time of the generated virtual viewpoint image is low noise level or high noise level based on the sound information from the environmental sound volume measurement apparatus 105 and the time information. The control unit 406 determines the time of the virtual viewpoint image based on the image-capturing time of the captured images used for the generation of the virtual viewpoint image. The determination on whether the sound level is low noise level or high noise level is done based on, for example, a threshold. The threshold is set as follows. In a case where the installment location of the environmental sound volume measurement apparatus 105 is a stadium where a soccer game or the like is taking place, the sound level is considered to be low noise level if the sound volume is 20 dB to 80 dB and to be high noise level if the sound volume is 80 dB or higher. Thus, for example, the threshold is set to 80 dB, and the sound level is determined to be low noise level if the sound volume indicated by the sound volume data obtained is below the threshold and is determined to be high noise level if the sound volume indicated by the sound volume data equals or exceeds the threshold.

If the sound information indicates low noise level (YES in S1106), in S1107 the control unit 406 derives the timing at which the advertisements displayed on the electronic signs change, based on the electronic sign information 500 obtained by the electronic sign information obtaining unit 405. Then, the control unit 406 performs control so that virtual advertisements may be displayed in synchronization with the advertisements on the electronic signs. The same synchronization method as the one described in connection with S605 may be used.

If the sound information indicates high noise level (NO in S1106), in S1108 the control unit 406 sets the timing for displaying the virtual advertisements such that the virtual advertisements may not be in synchronization with (or may be out of synchronization with) the advertisements on the electronic signs. For example, the control unit 406 controls the timing for switching a virtual advertisement displayed on a virtual content region so that the virtual advertisement switches to another virtual advertisement at a timing different from the timing at which the advertisement on the electronic sign switches.

As described, in the present embodiment, if the sound level in the image-capturing region is low noise level, the control unit 406 makes settings so that virtual advertisements may be displayed in synchronization with the advertisements on the electronic signs so as not to disturb the viewer's viewing experience. By contrast, if the sound level in the image-capturing region is high noise level, it is presumably a highlight such as a goal scene, and therefore the advertisement effectiveness should preferably be enhanced. Thus, at a time of high noise level, the virtual advertisements are controlled not to be displayed in synchronization with the advertisements on the electronic signs, so that both the virtual advertisements and the electronic signs can draw the attention of the viewer.

In S1109, the image processing apparatus 102 outputs the virtual viewpoint image having the virtual advertisements inserted thereto to the display apparatus 106.

Note that if the virtual viewpoint image contains both a time period with low noise level and a time period with high noise level, the settings for virtual advertisements may be changed for each of the time periods. For example, settings may be made such that virtual advertisements are displayed in synchronization with the advertisements on the electronic signs in the time period with low noise level and out of synchronization with the advertisements on the electronic signs in the time period with high noise level.

According to the present embodiment described above, virtual advertisement displaying methods are switched based on the sound level in the image-capturing region. Thus, the virtual contents can be displayed suitably according to the scene shown by the virtual viewpoint image.

Embodiment 3

Changing a virtual advertisement in synchronization with an electronic sign may make the change in the virtual advertisement more conspicuous than the change in the advertisement on the electronic sign. There is a concern of unfair advertisement display if one of the virtual advertisement and the electronic sign is more conspicuous than the other. Thus, in the present embodiment, a description is given of a method for helping prevent one of a virtual advertisement and an advertisement on an electronic sign from becoming more conspicuous than the other by controlling the illuminance of the virtual advertisement. In the present embodiment, differences from Embodiment 2 are mainly described. Embodiment 3 has the same configurations and performs the same processing as Embodiment 2 if they are not described specifically here.

Figure 12:
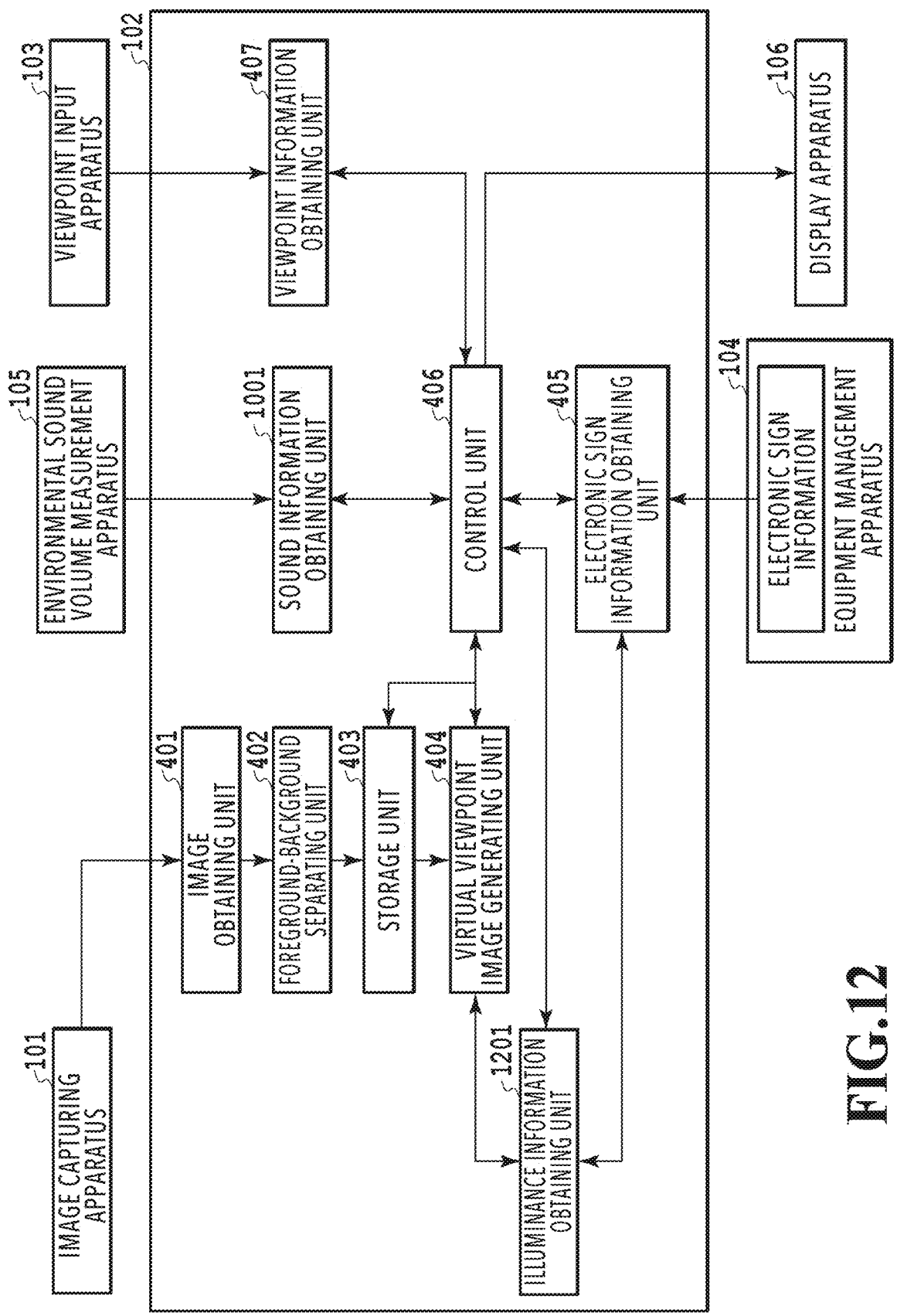
FIG. 12 is a block diagram showing a functional configuration of the image processing apparatus.

FIG. 12 is a block diagram showing a functional configuration of the image processing apparatus 102 in the present embodiment. The same processing blocks as those in Embodiment 2 are denoted by the same numbers as those used in Embodiment 2 and are not described here. The image processing apparatus 102 of the present embodiment further has an illuminance information obtaining unit 1201.

The illuminance information obtaining unit 1201 obtains the illuminance of an electronic sign and the illuminance of a virtual advertisement as information indicative of brightness. The illuminance information obtaining unit 1201 may obtain the illuminance of an electronic sign and the illuminance of a virtual advertisement calculated by another apparatus, or the illuminance information obtaining unit 1201 itself may derive the illuminance of an electronic sign and the illuminance of a virtual advertisement. The illuminance of an electronic sign is derived by, for example, calculating the illuminance of the electronic sign on an image separated as a background by the foreground-background separating unit 402.

Figure 13:
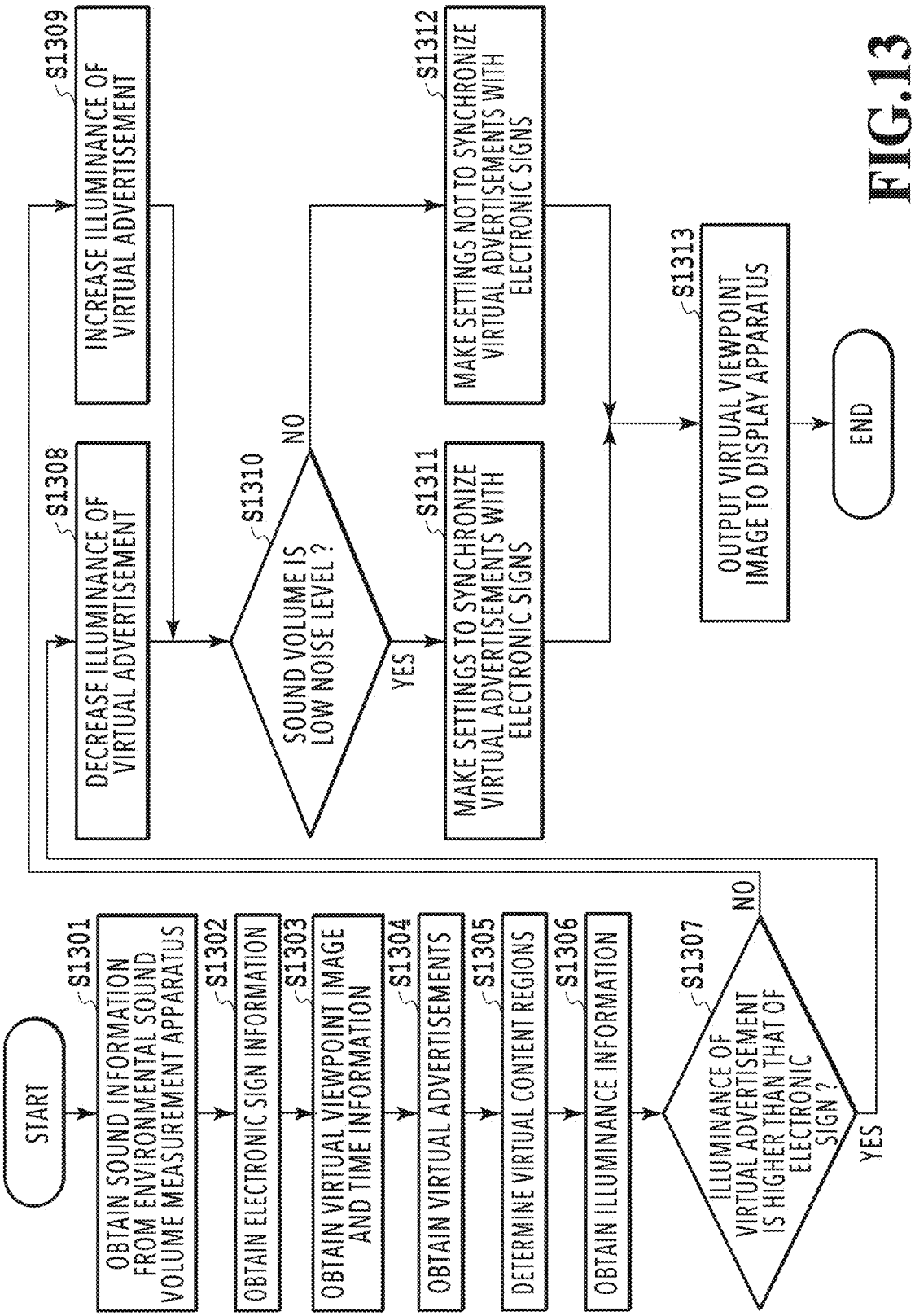
FIG. 13 is a flowchart showing processing of superimposing virtual advertisements on a virtual viewpoint image.

FIG. 13 is a diagram showing an example flowchart illustrating virtual advertisement displaying processing performed by the image processing apparatus 102 of the present embodiment. Note that before this flowchart starts, a virtual viewpoint image is generated by the image obtaining unit, the foreground-background separating unit, and the virtual viewpoint image generating unit. Alternatively, the virtual viewpoint image generation processing may be performed in parallel with the processing of this flowchart. S1301 to S1305 are the same processing as S1101 to S1105 and are therefore not described here.

In S1306, the illuminance information obtaining unit 1201 obtains the illuminance of the electronic sign in the virtual viewpoint image, and also, obtains the illuminances of a virtual advertisement superimposed on the virtual viewpoint image.

In S1307, the control unit 406 determines whether the illuminance of the virtual advertisement is higher than that of the electronic sign. If the illuminance of the virtual advertisement is higher than that of the electronic sign (YES in S1307), in S1308 the control unit 406 makes an adjustment by decreasing the illuminance of the virtual advertisement. If the illuminance of the virtual advertisement is equal to or lower than that of the electronic sign (NO in S1307), in S1309 the control unit 406 makes an adjustment by increasing the illuminance of the virtual advertisement.

The control unit 406 holds information on an appropriate range of differences in illuminance between a virtual advertisement and an electronic sign, and in S1308 and S1309, adjusts the illuminance of the virtual advertisement so that the difference in illuminance between the virtual advertisement and the electronic sign may fall within the appropriate range. In a possible adjustment method, for example, the control unit 406 adjusts the luminance of the virtual advertisement so that there is no longer a difference in luminance on screen between the virtual advertisement and the electronic sign or so that the difference in luminance on screen between the virtual advertisement and the electronic sign may fall within a predetermined range.

FIG. 14 is a diagram showing a virtual viewpoint image which contains virtual advertisements and electronic signs and is displayed on the display apparatus 106. Virtual advertisements 1401 to 1404 are displayed in synchronization with electronic signs 1411 to 1414, respectively. FIG. 14 depicts an example virtual viewpoint image where the illuminances (luminances) of the virtual advertisements 1401 to 1404 have been controlled by the control unit 406 so that the virtual advertisements 1401 to 1404 may not be more conspicuous than the advertisements on the electronic signs 1411 to 1414.

S1310 to S1313 are the same as S1106 to S1109, and are therefore not described here. Note that in a case where the sound volume is not low noise level but high noise level, control may be performed such that the luminance levels of the virtual advertisements are increased to increase their illuminances so that the virtual advertisements may be conspicuous.

Although the description of the present embodiment assumes that display control is performed like Embodiment 2 such that the virtual advertisements are displayed in synchronization or out of synchronization with the advertisements on the electronic signs based on the sound information obtained by the sound information obtaining unit 1001, a mode without the sound information obtaining unit 1001 is also possible. For example, the flowchart in FIG. 13 may skip Steps S1310 to S1312.

The present embodiment described above can help prevent one of a virtual content and a content on an electronic sign from becoming more conspicuous than the other. Thus, virtual contents and contents on electronic signs can be displayed with fairness, in a case where such fair display of both contents is need.

The technique of the present disclosure can help prevent a change in a virtual content contained in a virtual viewpoint image from making the virtual viewpoint image hard to view.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-200857, filed Nov. 5, 2019, which is hereby incorporated by reference wherein in its entirety.

What is claimed is:

1. An image processing apparatus comprising:
at least one processor or circuit configured to function as:
  a first obtaining unit configured to obtain data on a virtual viewpoint image, the virtual viewpoint image being generated based on image data on captured images captured by a plurality of image capturing apparatuses from different directions;
  a second obtaining unit configured to obtain information indicating a timing at which a displayed content captured by at least one of the plurality of image capturing apparatuses changes;
  a third obtaining unit configured to obtain sound volume data including sound volume in an image-capturing region of the plurality of image capturing apparatuses; and a control unit configured to perform control to cause a display unit to display the virtual viewpoint image having a virtual object inserted, the virtual object being an object that is not contained in the captured images, wherein based on the information, the control unit controls how the virtual object is displayed in the virtual viewpoint image on the display unit, and the control unit performs control such that the virtual object is displayed in synchronization with the displayed content in a case where the sound volume at a time of capturing the captured images used for generation of the virtual viewpoint image is below a threshold.

2. The image processing apparatus according to claim 1, wherein the control unit changes the virtual object displayed, at the same timing as the timing at which the displayed content is changed.

3. The image processing apparatus according to claim 1, wherein the information includes information on a content to be displayed on a display device captured by at least one of the plurality of image capturing apparatuses, and the control unit causes a virtual object which is the same as the displayed content on the display device at the same timing as the timing at which the content is displayed on the display device.

4. The image processing apparatus according to claim 1, wherein the displayed content changes thereon at predetermined time intervals, and the control unit performs control such that the virtual object to be displayed changes at the predetermined time intervals.

5. The image processing apparatus according to claim 1, wherein the control unit generates, based on the information, the virtual object that synchronizes with the displayed content, and disposes the generated virtual object on a predetermined region.

6. The image processing apparatus according to claim 1, wherein the control unit performs control such that the virtual object is displayed in synchronization with the displayed content which is within a predetermined range of distance from a region where the virtual object is inserted.

7. The image processing apparatus according to claim 1, wherein the control unit performs control such that the virtual object is displayed out of synchronization with the displayed content in a case where the sound volume at the time of capturing the captured images used for generation of the virtual viewpoint image equals or exceeds the threshold.

8. The image processing apparatus according to claim 1, wherein the virtual object is different from the displayed content.

9. The image processing apparatus according to claim 1, wherein the at least one processor or circuit is further configured to function as:

a fourth obtaining unit configured to obtain illuminance of the displayed content and illuminance of the virtual object, and the control unit controls the illuminance of the virtual object based on the illuminance of the displayed content and the illuminance of the virtual object.

10. The image processing apparatus according to claim 9, wherein the fourth obtaining unit obtains luminance of the displayed content on the virtual viewpoint image as the illuminance of the displayed content, and the control unit adjusts the luminance of the virtual object on the virtual viewpoint image so that a difference between the luminance of the displayed content on the virtual viewpoint image and the luminance of the virtual object on the virtual viewpoint image falls within a predetermined range.

11. The image processing apparatus according to claim 1, wherein the displayed content and a content displayed as the virtual object are advertisements.

12. The image processing apparatus according to claim 1, wherein the at least one processor or circuit is further configured to function as:

a fourth obtaining unit configured to obtain viewpoint information on a virtual viewpoint of the virtual viewpoint image; and a determining unit configured to determine a region to insert the virtual object according to the viewpoint information.

13. The image processing apparatus according to claim 1, wherein the information includes contents to be displayed as well as a display order, intervals, and a start time of the contents, and based on the information, the control unit derives a timing at which the displayed content changes.

14. The image processing apparatus according to claim 1, wherein the control unit causes the display unit to display the virtual viewpoint image in which the virtual object is displayed in a predetermined region on the virtual viewpoint image.

15. The image processing apparatus according to claim 1, wherein the displayed content is displayed on a display device, the display device being contained in at least one of the captured images and configured to change the displayed content on a time basis.

16. An image processing method comprising:

obtaining data on a virtual viewpoint image, the virtual viewpoint image being generated based on image data on captured images captured by a plurality of image capturing apparatuses from different directions;

obtaining information indicating a timing at which a displayed content captured by at least one of the plurality of image capturing apparatuses changes;

obtaining sound volume data including sound volume in an image-capturing region of the plurality of image capturing apparatuses; and performing control to cause a display unit to display the virtual viewpoint image having a virtual object inserted, the virtual object being an object that is not included in the captured images, wherein in the performing control, how the virtual object is displayed on the virtual viewpoint image on the display unit is controlled based on the information, and in the performing control, the virtual object is displayed in synchronization with the displayed content in a case where the sound volume at a time of capturing the captured images used for generation of the virtual viewpoint image is below a threshold.

17. A non-transitory computer readable storage medium storing a program which causes a computer to perform an image processing method comprising:

obtaining data on a virtual viewpoint image, the virtual viewpoint image being generated based on image data on captured images captured by a plurality of image capturing apparatuses from different directions;

obtaining information indicating a timing at which a displayed content captured by at least one of the plurality of image capturing apparatuses changes;

obtaining sound volume data including sound volume in an image-capturing region of the plurality of image capturing apparatuses; and performing control to cause a display unit to display the virtual viewpoint image having a virtual object inserted, the virtual object being an object that is not included in the captured images, wherein in the performing control, how the virtual object is displayed on the virtual viewpoint image on the display unit is controlled based on the information, and in the performing control, the virtual object is displayed in synchronization with the displayed content in a case where the sound volume at a time of capturing the captured images used for generation of the virtual viewpoint image is below a threshold.

* * * * *